(12) United States Patent
Hamamura

(10) Patent No.: US 6,628,336 B2
(45) Date of Patent: Sep. 30, 2003

(54) INFORMATION PROCESSING APPARATUS WITH POWER SAVING CONTROL

(75) Inventor: Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/882,406

(22) Filed: Jun. 25, 1997

(65) Prior Publication Data

US 2002/0054221 A1 May 9, 2002

(30) Foreign Application Priority Data

Jun. 25, 1996 (JP) .............................. 8-164288

(51) Int. Cl.⁷ ........................ H04N 5/222; H04N 5/225
(52) U.S. Cl. ...................................... 348/371; 348/372
(58) Field of Search ................................ 348/372, 373, 348/333.13, 207, 222, 231, 232, 371, 207.99, 222.1, 231.99, 231.3; 358/906, 909.1; 396/205, 206

(56) References Cited

U.S. PATENT DOCUMENTS

| | | | | | |
|---|---|---|---|---|---|
| 4,827,347 A | * | 5/1989 | Bell | ........................... | 358/906 |
| 4,945,424 A | * | 7/1990 | Hiroki et al. | ............... | 358/906 |
| 5,130,812 A | * | 7/1992 | Yamaoka | ................. | 358/909.1 |
| 5,250,978 A | * | 10/1993 | Ogawa | ........................ | 396/206 |
| 5,301,071 A | * | 4/1994 | Takimoto | ..................... | 360/61 |
| 5,438,367 A | * | 8/1995 | Yamamoto et al. | ......... | 348/371 |
| 5,606,420 A | * | 2/1997 | Maeda et al. | ............... | 358/906 |
| 5,640,203 A | * | 6/1997 | Wakui | ......................... | 348/231 |
| 5,648,816 A | * | 7/1997 | Wakui | ......................... | 348/233 |
| 5,657,084 A | * | 8/1997 | Kurokawa et al. | ........... | 348/373 |
| 5,710,597 A | * | 1/1998 | Tamaki et al. | ............... | 348/372 |
| 5,729,289 A | * | 3/1998 | Etoh | ........................... | 348/373 |
| 5,748,831 A | * | 5/1998 | Kubo | .......................... | 358/906 |
| 5,815,204 A | * | 9/1998 | Abe et al. | .................... | 348/371 |
| 5,845,166 A | * | 12/1998 | Fellegara et al. | ............ | 348/64 |
| 6,111,609 A | * | 8/2000 | Stevens | ...................... | 348/372 |

FOREIGN PATENT DOCUMENTS

GB  2289555  * 11/1995  ............ H04N/1/00

* cited by examiner

*Primary Examiner*—Aung S. Moe
(74) *Attorney, Agent, or Firm*—Oliff & Berridge, PLC (57) ABSTRACT

When the power supply is turned on, the value of a mode flag first is set to 0, the mode flag is evaluated, and processing of the record mode is executed. In the record mode, charging processing of the strobe is performed for a specified interval of time, and the strobe can be reliably caused to flash. Charging processing of the strobe is not performed while processing of reproduction (play) mode or another mode is being performed, and battery consumption is controlled.

8 Claims, 7 Drawing Sheets

INFORMATION PROCESSING APPARATUS WITH POWER SAVING CONTROL

INCORPORATION BY REFERENCE

The disclosure of the following priority application is herein incorporated by reference: Japanese Patent Application No. HEI-8-164288 filed Jun. 25, 1996.

BACKGROUND OF THE INVENTION

1. Field of Invention

The present invention relates to an information processing apparatus, for example, an information processing apparatus well-suited for use in an electronic camera, and the like, that converts an image of an object to digital data and records the data. The invention also relates to a method for operating an information processing apparatus.

2. Description of Related Art

In contrast to cameras using film, electronic cameras photograph images of objects using a CCD, and the like, convert those images to digital data, and record that data in internal memory, removable memory cards, and the like. Images photographed using these electronic cameras can be reproduced on the spot and displayed on LCD screens, and the like, without undergoing development and printing as with conventional cameras.

Among such electronic cameras, when recording an image, and when reproducing an image while being set in record mode, there are those being provided with a setting switch, separate from the power supply switch, for setting a reproduction (play) mode. Alternatively, there are digital cameras having a function added to the power supply switch for switching between the record mode and reproduction (play) mode. For example, the power supply is turned off when the power supply switch is moved to the center, it becomes record mode when the power supply switch is moved to the left, and it becomes reproduction (play) mode when the power supply switch is moved to the right.

However, there was a problem that, when a switch for setting record mode and reproduction (play) mode is provided separately from the power supply switch, and when wishing to photograph a specified object, it is necessary to operate the setting switch after having first turned on the power supply switch, and opportunities for photography and sound recording may be missed.

Also, there was a problem that, when the power supply switch serves also as a setting switch for performing setting of record mode and reproduction (play) mode, and when having attempted to photograph a specified object, the reproduction (play) mode may get set by operational error, and opportunities for photography and sound recording may be missed.

Furthermore, when attempting to perform photography, having suddenly set to record mode, opportunities for photography may be missed due to the strobe not being fully charged in time. Thus, because charging of the strobe occurs during the reproduction (play) mode, there was a problem that the batteries could wear out prematurely.

SUMMARY OF THE INVENTION

The present invention was created in consideration of such conditions, and it enables recording on the spot when wishing to record information.

The inventive information processing apparatus can comprise an input device (for example, shooting lens 3 of FIG. 1, CCD 20 of FIG. 3, and microphone 8 of FIG. 1) for inputting information, a memory device (for example, memory card 24 of FIG. 3) for storing information input by the input device, a power supply (for example, batteries 21 of FIG. 3) for supplying electric power to the input device, an indicator (for example, power supply switch 11 of FIG. 1) for indicating power supply to the input device, and a mode switching device (for example, touch tablet 6A of FIG. 2 and pen-type pointing device 46 of FIG. 4) capable of switching a first mode capable of storing in the memory information input by the input device, and a second mode for reproducing information stored in the memory, wherein the mode switching device switches to the first mode when power supply is indicated by the indicator means. Also, the input device can be made so as to input image or sound.

The information processing apparatus may comprise an input driving device (for example, shooting lens 3 of FIG. 1, CCD 20 of FIG. 3, microphone 8 of FIG. 1, and condenser 22 of FIG. 3) for driving input information, a memory (for example, memory card 24 of FIG. 3) for storing information input by driving of the input driving device, a power supply (for example, batteries 21 of FIG. 3) for supplying electric power to the input driving device, and a mode switching device (for example, touch tablet 6A of FIG. 2 and pen-type pointing device 46 of FIG. 4) capable of switching a first mode capable of storing in the memory information input by driving of the input driving device, and a second mode capable of reproducing information stored in the memory, wherein driving of the input driving device is stopped when the second mode is switched by the switching device.

Also, the power supply can be made so as to stop power supply to the input driving device when the second mode is switched by the switching device.

Also, the input driving device can be made so as to have an imaging device (for example, CCD 20 of FIG. 3, and image processor 31, lens drive circuit 30, and CCD drive circuit 39 of FIG. 4) for imaging an image of an object.

Also, the input driving device can be made so as to have a charge accumulating device (for example, condenser 22 of FIG. 3) for accumulating charge required in order to drive an illuminating device (for example, flash component 4 of FIG. 1) for illuminating an object.

Also, the input driving device can be made so as to have a sound input device (for example, microphone 8 of FIG. 1) for inputting sound.

Also, driving of the input driving device can be made so as to be permitted when the first mode is switched by the switching device.

Also, the apparatus can be made so as to further comprise a display (for example, LCD 6 of FIG. 2) for displaying information input by driving of the input driving device.

The information processing apparatus can comprise an imaging device (for example, shooting lens 3 of FIG. 1 and CCD 20 of FIG. 3) for imaging an image of a specified object, a sound input device (for example, microphone 8 of FIG. 1) for inputting a specified sound, a memory (for example, memory card 24 of FIG. 3) for storing information corresponding to the image imaged by the imaging device and information corresponding to the sound input by the sound input device, a mode switching device (for example, touch tablet 6A of FIG. 3 and pen-type pointing device 46 of FIG. 4) for switching the mode, a recording and reproducing device (for example, DSP 33 of FIG. 4) for recording to the memory information corresponding to the sound input by the sound input device, and reproducing information corresponding to the sound stored in the memory, and an indicator (for example, sound recording switch 12 of FIG. 2) for indicating the start of recording to the memory information corresponding to the sound input by the sound input device, and indicating the start of reproducing the sound stored in the memory, wherein the indicator indicates the start of recording to the memory information corresponding to the sound input by the sound input device when the mode capable of recording the information is switched by the mode switching device, and indicates the start of reproducing information corresponding to the sound stored in the memory when the mode capable of reproducing the recorded information is switched by the mode switching device.

In the information processing apparatus according to a first aspect of the invention, the input device inputs information; the memory stores information input by the input device; the power supply supplies electric power to the input device; the indicator indicates power supply to the input device; the mode switching device switches a first mode capable of storing in the memory information input by the input device, and a second mode for reproducing information stored in the memory. The mode switching device switches to the first mode when power supply is indicated by the indicator. Consequently, the apparatus can automatically enter a mode capable of storing information when the power supply is turned on.

When power supply is indicated by the indicator, the mode switching device switches to the first mode capable of storing in the memory information input by the input device. Therefore, the apparatus can automatically enter a mode capable of storing information when the power supply is turned on, and it becomes possible to have information stored immediately when wishing to have it stored.

In the information processing apparatus according to a second aspect of the invention, the input driving device is driven to input information; the memory stores information input by driving of the input driving device; the power supply supplies electric power to the input driving device; the mode switching device switches a first mode capable of storing in the memory information input by driving of the input driving device, and a second mode capable of reproducing information stored in the memory. Driving of the input driving device is stopped when the second mode is switched by the switching device. Consequently, the input driving device can be driven only when in a mode capable of storing information.

Between a first mode capable of storing in the memory information input by driving of the input driving device, and a second mode capable of reproducing information stored in the memory, when the second mode is switched by the switching device, driving of the input driving device is stopped. Therefore, the input driving device can be driven only when in a mode capable of storing information, wasteful consumption of electric power of the power supply can be controlled, and information can be caused to be stored rapidly when switched to the first mode.

In the information processing apparatus according to a third aspect of the invention, the imaging drive acquires an image of a specified object; the sound input drive inputs a specified sound; the memory stores information corresponding to the image imaged by the imaging device and information corresponding to the sound input by the sound input device; the recording and reproducing device records to the memory information corresponding to the sound input by the mode switching device for switching the mode and the sound input device, and reproduces information corresponding to the sound stored in the memory; the indicator indicates the start of recording to the memory information corresponding to the sound input by the sound input device, and indicates the start of reproducing the sound stored in the memory. The indicator indicates the start of recording to the memory information corresponding to the sound input by the sound input device when the mode capable of recording the information is switched by the mode switching device, and indicates the start of reproducing information corresponding to the sound stored in the memory when the mode capable of reproducing the recorded information is switched by the mode switching device. Consequently, the indicator can perform different indications during the mode capable of recording information and the mode capable of reproducing information.

The indicator indicates the start of recording, to the memory, of information corresponding to the sound input by the sound input device when a mode capable of recording the information is switched by the mode switching device, and indicates the start of reproduction of information corresponding to the sound stored in the memory when a mode capable of reproducing the recorded information is switched by the mode switching device. Therefore, the indicator can perform different indications during the mode capable of recording information and the mode capable of reproducing information. Consequently, the operating components can be simplified, and operability can be improved.

These and other aspects and salient features of the present invention will be described in or apparent from the following detailed description of preferred embodiments.

BRIEF DESCRIPTION OF THE DRAWINGS

The invention will be described in relation to the following drawings, in which.

DETAILED DESCRIPTION OF PREFERRED EMBODIMENTS

Figure 1:
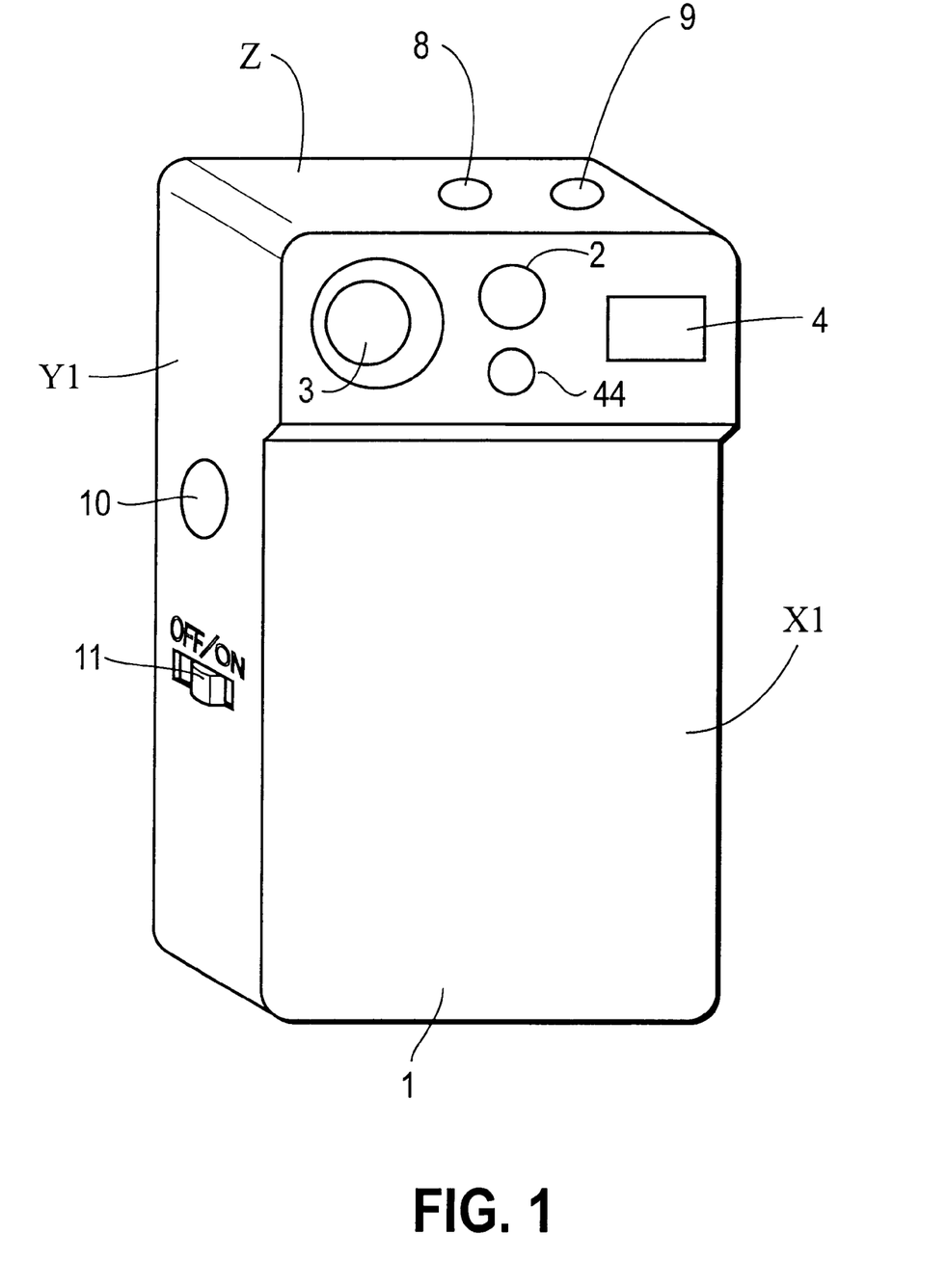
FIG. 1 is a front perspective view of embodiment of an electronic camera according to the present invention.
Figure 2:
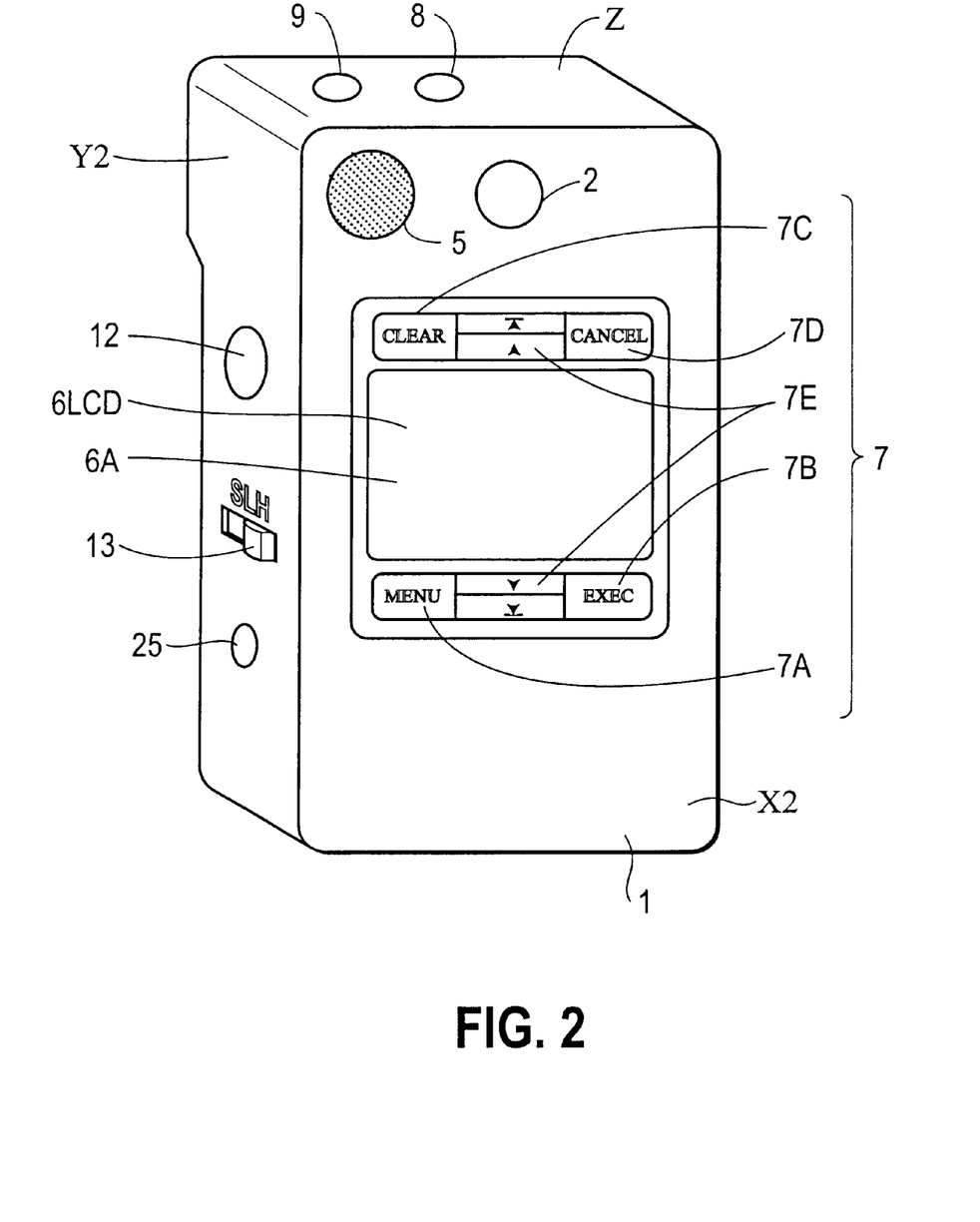
FIG. 2 is a rear perspective view of an electronic camera according to the present invention.

FIG. 1 and FIG. 2 are perspective views showing a configuration of one embodiment of an electronic camera of the present invention. For convenience of explanation, among the six surfaces constituting electronic camera 1, when photographing an object, the surface oriented toward the object is surface X1, and the surface oriented toward the user is surface X2. On the upper part of surface X1, there are provided a finder 2 used in confirmation of the shooting scope of the object, a shooting lens 3 for acquiring a light image of the object, a flash component (strobe) 4 for emitting light to illuminate the object, and a red-eye reduction lamp 44 for controlling the red-eye phenomenon.

Figure 4:
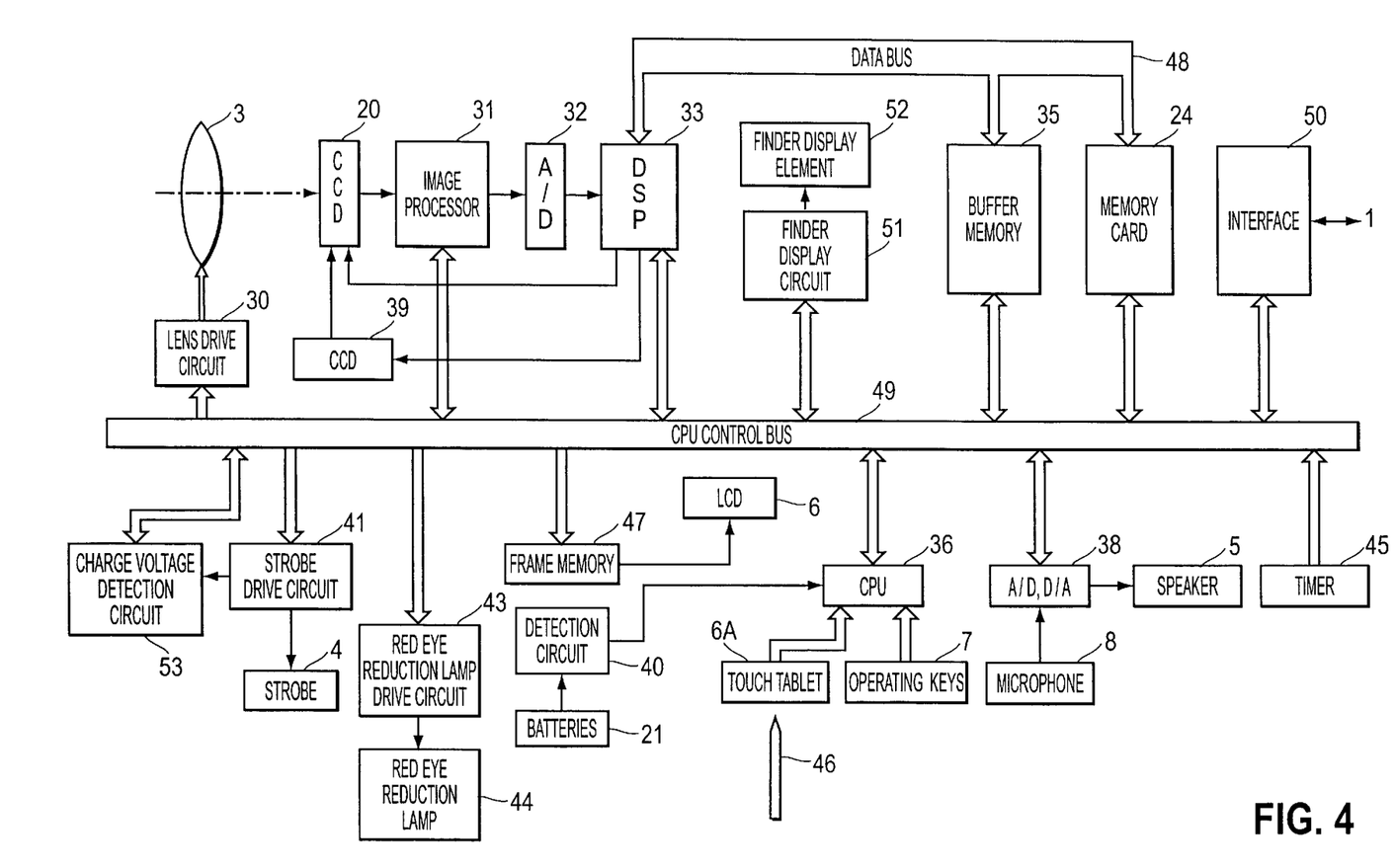
FIG. 4 is a block drawing showing an example of an internal electrical configuration of an electronic camera according to the present invention.

Meanwhile, on the upper part of surface X2 opposite surface X1 (the position corresponding to the upper part of surface X1 on which finder 2, shooting lens 3, and strobe 4 are formed), there are provided the finder 2 and a speaker 5. Speaker 5 outputs sound corresponding to sound data recorded on a memory card, or the like, installed inside electronic camera 1. Also, LCD 6 and operating keys 7, formed on surface X2, are positioned vertically below finder 2, shooting lens 3, flash component 4, and speaker 5. Also, on the surface of LCD 6, there is formed a so-called touch tablet 6A for inputting positional data corresponding to positions indicated by contact operation with a specified pen-type pointing device 46 (FIG. 4).

The touch tablet 6A is constituted by a transparent material such as glass and resin so that the user can observe via touch tablet 6A an image displayed on LCD 6 formed inside touch tablet 6A.

Operating keys 7 are constituted by a plurality of keys corresponding to various functions as described later, they are operated by pen-type pointing device 46, and they are used when reproducing and displaying on LCD 6 recorded data, such as image data, sound data or text data, recorded on an internally installed memory card, or the like. For example, menu key 7A is operated when causing menu information to be displayed on LCD 6. Execute (run) key 7B is operated when reproducing recorded data selected by the user.

Also, clear key 7C is operated when deleting recorded data. Cancel key 7D is operated when interrupting reproduction processing of recorded data. Scroll keys 7E are operated when scrolling the screen in a vertical direction.

On a top surface Z of the electronic camera 1, there are provided a microphone (mike) 8 for collecting sound and an earphone jack 9 for connecting an earphone (not illustrated).

On the left side surface (surface Y1), there are provided a release switch 10 operated when photographing an object and a power supply switch 11 for switching the power supply on and off. The release switch 10 and power supply switch 11 are positioned vertically below finder 2, shooting lens 3, and flash component 4, provided on the upper part of surface X1.

Meanwhile, on surface Y2 (right side surface) opposite surface Y1, there are provided a sound recording switch 12 operated when recording sound, and a continuous mode switch 13 operated when switching the continuous mode during photography. The sound recording switch 12 and continuous mode switch 13 are positioned vertically below finder 2, shooting lens 3, and flash component 4, provided on the upper part of surface X1, in the same manner as in the case of the release switch 10 and power supply switch 11. Also, sound recording switch 12 is positioned at substantially the same height as release switch 10 on surface Y1 so that there is no feeling of incongruity when held with either the left or right hand.

The height of release switch 10 and the height of sound recording switch 12 can be made intentionally different so that, when a switch only on one side is pressed, the switch on the opposite side surface is not accidentally pressed when the opposite side surface is held by a finger to cancel the moment caused by this pressing.

The continuous mode switch 13 is used to set photography of either only one frame of the object or a specified plurality of frames continuously. For example, when the indicator of continuous mode switch 13 is switched to the position printed with "S" (that is, when switched to S mode), only one single frame of photography is performed when release switch 10 is pressed.

Also, when the indicator of continuous mode switch 13 is switched to the position printed with "L" (that is, when switched to L mode), and when release switch 10 is pressed, photography at a rate of eight frames per second, for example, is performed while release switch 10 is pressed.

Furthermore, when the indicator of continuous mode switch 13 is switched to the position printed with "H" (that is, when switched to H mode), and when release switch 10 is pressed, photography at a rate of thirty frames per second, for example, is performed while release switch 10 is pressed.

Figure 3:
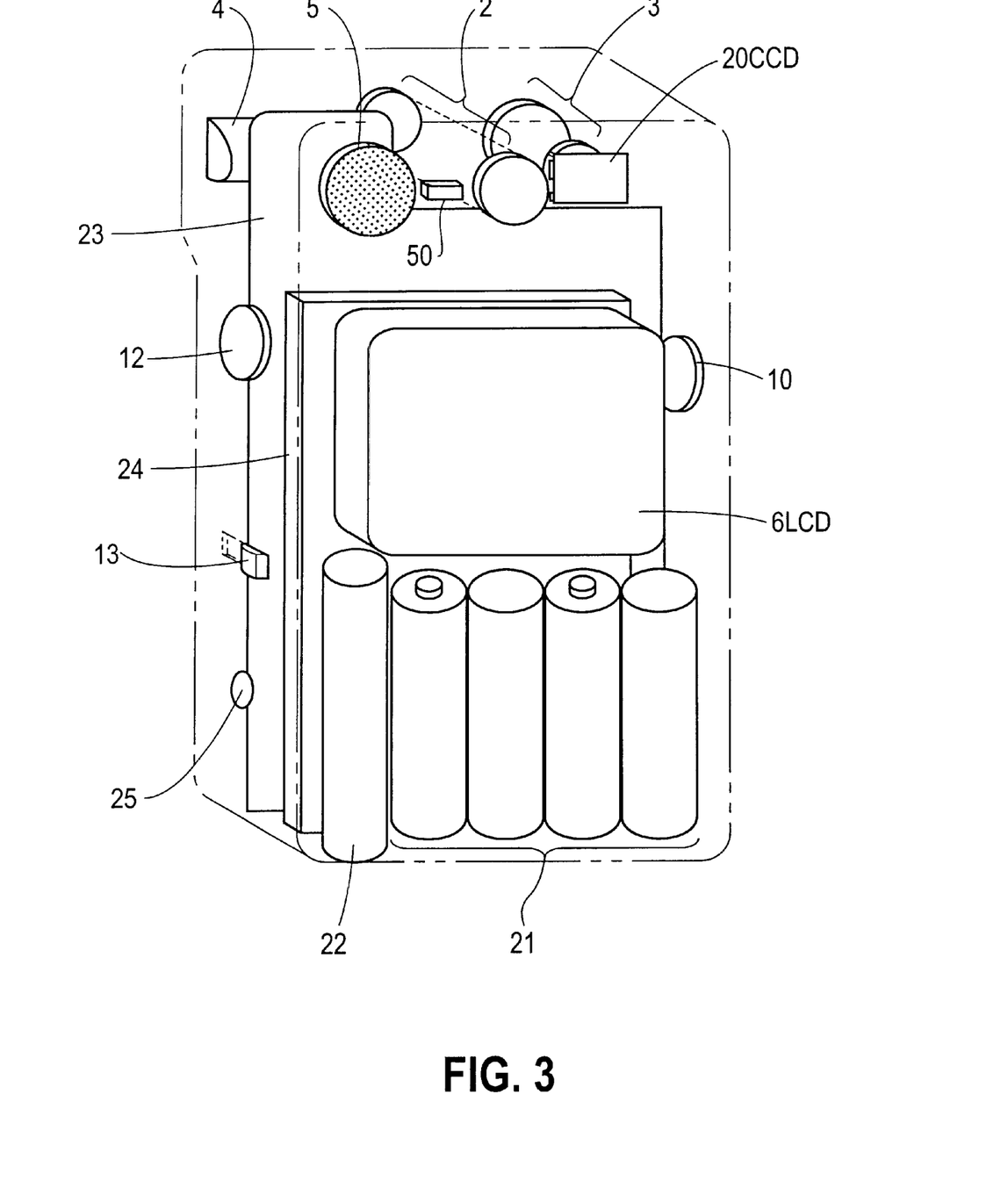
FIG. 3 is a drawing showing an example of an internal configuration of an electronic camera according to the present invention.

Next, the internal configuration of electronic camera 1 is explained. FIG. 3 is a perspective view showing an example of the internal configuration of the electronic camera shown in FIG. 1 and FIG. 2. CCD 20 is provided at the rear part (side of surface X2) of shooting lens 3 so as to convert photoelectrically the light image of the object, formed via shooting lens 3, to corresponding electrical signals (image signals), and to output the signals.

Vertically below LCD 6, there are arranged four cylindrical batteries (for example, AA dry cells) 21, for example, and electric power accumulated in these batteries 21 is supplied to the camera components. Also, a condenser 22 for accumulating the charge required when flash component 4 emits light is placed alongside batteries 21.

On a circuit board 23, there are formed various types of control circuits for controlling each component of electronic camera 1. Also, between circuit board 23 and LCD 6 as well as batteries 21, there is provided a removable memory card (e.g., recording means) 24, and various types of information input into electronic camera 1 are recorded in each predetermined area of memory card 24.

In the present embodiment, memory card 24 is removable, but memory may also be provided on circuit board 23 such that each type of information can be recorded in that memory. Furthermore, the various types of information recorded on memory card (or memory) 24 can also be output to an external personal computer via an input/output port 25.

Next, the internal electrical configuration of electronic camera 1 of the present embodiment is explained, referring to the block diagram shown in FIG. 4. CCD 20, comprising a plurality of pixels, photoelectrically converts to image signals (electrical signals) the light image formed on each pixel. CCD drive circuit 39 is controlled by a digital signal processor (DSP) 33, described later, so as to drive CCD 20. Lens drive circuit 30 moves shooting lens 3 in the direction of the optical axis so as to perform focusing control, and the like.

Image processor 31 is constituted by a correlated double sampling circuit (CDS) and automatic gain control circuit (AGC), and the like. CDS is sampled at a specified timing for the image signals photoelectrically converted by CCD 20. AGC controls the gain of signals sampled by CDS. Analog/digital conversion circuit (A/D conversion circuit) 32 digitizes the image signals sampled by CDS of image processor 31, and supplies the signals to DSP 33.

DSP 33 temporarily supplies the digitized image data to buffer memory 35 and has it stored. Also, DSP 33 reads the image data stored in buffer memory 35 and compresses it, for example, by the JPEG (Joint Photographic Experts Group) method, described later, then supplies the data to memory card 24 via data bus 48, and has it recorded in a specified area (image recording area).

Also, CPU 36 acquires the time from timer 45 so that information of the date and time having photographed is recorded in the image recording area of memory card 24 as header information of the image data. That is, in the image recording area of memory card 24, there is appended data of photographic date and time.

Microphone (mike) 8 inputs sound and supplies sound signals corresponding to that sound to A/D-D/A converter 38. A/D-D/A converter 38 converts the supplied sound signals to digital sound (audio) data, and supplies the data to DSP 33. DSP 33 compresses the sound data supplied by A/D-D/A converter 38, then supplies the data to memory card 24 so as to have it stored in the specified area (sound recording area). Also, at this time, in the sound recording area of memory card 24, data of the recording date and time is recorded as header information of the sound data.

Also, strobe drive circuit 41 is controlled by CPU 36 so as to drive strobe (flash component) 4. Strobe 4 is driven by strobe control circuit 41 so as to emit light at a specified timing and to project the light onto the object. Charge voltage detection circuit 53 detects the value of voltage of condenser 22 constituting strobe drive circuit 41, and supplies signals corresponding to the detected value of voltage to CPU 36.

Red-eye reduction lamp drive circuit 43 is controlled by CPU 36 so as to drive red-eye reduction lamp 44. Red-eye reduction lamp 44 is driven by red-eye reduction lamp drive circuit 43 so as to emit light at a specified timing.

When a specified position of touch tablet 6A is pressed by pen-type pointing device 46 operated by the user, CPU 36 reads the X-Y coordinates corresponding to the pressed position of touch tablet 6A, and accumulates that coordinate data (constituting line-drawing information described later) in a specified memory, not illustrated. Also, CPU 36 supplies the line-drawing information accumulated in memory to memory card 24 along with header information of the date and time the line-drawing information was input, and has it recorded in the line-drawing information recording area.

Buffer memory 35 and frame memory 47 are connected to CPU 36 via CPU control bus 49. Also, images corresponding to image data stored in buffer memory 35 can be displayed on LCD 6 via frame memory 47. However, image data having undergone compression processing is supplied to buffer memory 35 via data bus 48 after once having been decompressed by DSP 33.

Also, speaker 5 is connected to A/D-D/A converter 38 so that sound data read from memory card 24 is output by speaker 5 after having been decompressed by DSP 33, and converted to analog sound signals by A/D-D/A converter 38. Detection circuit 40 detects the value of voltage of batteries 21 and supplies data corresponding to the detected value of voltage to CPU 36.

Also, when the operating keys 7, and the various switches such as release switch 10, power supply switch 11, sound recording switch 12, and continuous mode switch (in FIG. 1 through FIG. 3) are operated, the corresponding signals are supplied to CPU 36. Also, when operating keys 7 or various switches are operated, CPU 36 executes the specified processing corresponding thereto.

Finder display circuit 51 controls a finder display element 52 provided inside finder 2, and information such as, for example, information indicating whether or not the presently set shutter speed and aperture are matched, and information indicating whether or not strobe 4 is usable (whether or not the charge voltage of condenser 22 is at a specified value), is displayed in characters and figures so as to inform the user.

Interface 50 performs input/output of data with external devices via input/output port 25.

Next, the operation is explained. First, input/output processing of sound in the above-mentioned embodiment is explained. When power supply switch 11 shown in FIG. 1 is switched to the side printed with "ON," electric power is introduced into electronic camera 1, and when sound recording switch 12 provided on surface Y2 is pressed, processing of sound recording (processing performing input of sound and its recording) is initiated. That is, sound input via microphone 8 is converted to digital sound (audio) data by A/D-D/A converter 38, and compression processing is applied in DSP 33, then the data is supplied to memory card 24 and is recorded in the sound recording area of memory card 24. At this time, in the sound recording area of memory card 24, data of the date and time of sound recording, and the like, is recorded as header information of the compressed sound data. Such operation is executed repeatedly while sound recording switch 12 is pressed. Or, it is executed repeatedly for a specified time after sound recording switch 12 is pressed. As a compression method for sound, the Pulse Code Modulation (PCM) method and other methods can be used.

Next, operation when photographing an object is explained. First, the case when continuous mode switch 13 provided on surface Y2 is switched to S mode (mode performing only one frame of photography) is explained. First, power supply switch 11 provided on the side of surface Y1 is switched to the side printed with "ON" and electric power is introduced into electronic camera 1, as shown in FIG. 1. When release switch 10 provided on surface Y1 is pressed, confirming the object in finder 2, photographic processing of the object is initiated.

The light image of the object observed in finder 2 is collected by shooting lens 3 and the image is formed on CCD 20 comprising a plurality of pixels. The light image of the object formed on CCD 20 is photoelectrically converted to image signals in each pixel and is sampled by CDS constituting image processor 31. After the gain of the image signals sampled by CDS is controlled in AGC constituting image processor 31, the signals are supplied to A/D conversion circuit 32, are digitized there, and are provided to DSP 33.

DSP 33 temporarily supplies the digitized image data to buffer memory 35, and has it stored. Also, the image data stored in buffer memory 35 is compressed according to the JPEG method, having combined discrete cosine transform, quantization, and Huffman encoding. After that, the compressed image data is supplied to memory card 24 via data bus 48. Memory card 24 records the image data supplied by DSP 33 to the image recording area. At this time, in the image recording area of memory card 24, data of the date and time of photography is recorded as header information of the above-mentioned image data.

When continuous mode switch 13 is switched to S mode, only one frame of photography is performed each time release switch 10 is pressed. Consequently, even when release switch 10 is pressed and it continues to be pressed in that manner, only one frame of photography is performed. Also, when release switch 10 is continuously pressed, continuing for a specified amount of time, the image just photographed is displayed on LCD 6.

Next, the case when continuous mode switch 13 is switched to L mode (mode performing continuous shooting at eight frames per second) is explained. First, power supply switch 11 provided on the side of surface Y1 is switched to the side printed with "ON" and electric power is introduced into electronic camera 1. When release switch 10 provided on surface Y1 is pressed, photographic processing of the object is initiated as follows.

The light from the object observed in finder 2 is collected by shooting lens 3 and an image is formed on CCD 20 comprising a plurality of pixels. The light image of the object formed on CCD 20 is photoelectrically converted to image signals in each pixel and is sampled at a rate of eight times per second by CDS of image processor 31. Also, at this time, CDS thins out a number equivalent to three fourths of the pixels from CCD 20 among the electrical image signals corresponding to all the pixels.

The image signals sampled by CDS (image signals of one fourth of the pixels of all pixels of CCD 20) are supplied to A/D conversion circuit 32, are digitized there, and are output to DSP 33.

DSP 33 temporarily supplies the digitized image data to buffer memory 35, and it is stored. Also, the image data stored in buffer memory 35 is read by DSP 33 and compressed according to the JPEG method. The compression-processed image data is supplied to memory card 24 via data bus 48, and it is stored in the image recording area. At this time, in the image recording area of memory card 24, data of the date and time of photography is recorded as header information of the above-mentioned image data.

Next, the case when continuous mode switch 13 is switched to H mode (mode performing continuous shooting at thirty frames per second) is explained. First, power supply switch 11 provided on the side of surface Y1 is switched to the side printed with "ON" and electric power is introduced into electronic camera 1. When release switch 10 provided on surface Y1 is pressed, photographic processing of the object is initiated as follows.

The light from the object observed in finder 2 is collected by shooting lens 3 and an image is formed on CCD 20. The light image of the object formed on CCD 20, comprising a plurality of pixels, is photoelectrically converted to image signals in each pixel and is sampled at a rate of thirty times per second by CDS of image processor 31. Also, at this time, CDS thins out a number equivalent to eight ninths of the pixels from CCD 20 among the electrical image signals corresponding to all the pixels.

The image signals sampled by CDS (image signals of one ninth of the pixels of all pixels of CCD 20) are supplied to A/D conversion circuit 32, are digitized there, and are output to DSP 33.

DSP 33 temporarily supplies the digitized image data to buffer memory 35, and has it stored. Also, DSP 33 reads the image data stored in buffer memory 35 and compresses it according to the JPEG method. Doing thus, the digitized and compression-processed image data is supplied to memory card 24 via data bus 48, and is recorded in the image recording area of memory card 24 along with header information of the date and time of photography.

During photography of an object, light also can be projected on the object by causing strobe (flash component) 4 to operate according to need. In this case, strobe 4 emits light at a specified timing according to control of strobe drive circuit 41. Also, red-eye reduction lamp 44 also can be made to emit light in order to control the red-eye phenomenon. In this case, red-eye reduction lamp 44 emits light at a specified timing according to control of red-eye reduction lamp drive circuit 43.

Next, operation when inputting two-dimensional information (pen input information (line-drawing information)) using touch tablet 6A is explained. When the pen tip of pen-type pointing device 46 contacts touch tablet 6A, data corresponding to the XY coordinates of the contacted location is supplied to CPU 36. Based on the data corresponding to these XY coordinates, CPU 36 writes image data corresponding to a point, for example, having a specified size, in the position in frame memory 47 corresponding to the above-mentioned XY coordinates. By this, a point of the specified size is displayed in a corresponding position on LCD 6.

Because touch tablet 6A formed on the surface of LCD 6 is constituted by a transparent material, as described above, the user can observe the point displayed in the position on LCD 6 having pressed touch tablet 6A with the pen tip of pen-type pointing device 46 and can feel as if having performed direct pen input on LCD 6. Also, when pen-type pointing device 46 is moved on touch tablet 6A, on LCD 6 there is displayed a line following the course of movement of pen-type pointing device 46. Furthermore, when pen-type pointing device 46 is moved intermittently on touch tablet 6A, on LCD 6 there is displayed a broken line following the movement of pen-type pointing device. As such, the user can input the desired line-drawing information such as characters and figures using touch tablet 6A, LCD 6.

Also, when an image is displayed on LCD 6, and when line-drawing information such as characters, for example, is input by pen-type pointing device 46, this line-drawing information is composed in frame memory 47, and it is displayed simultaneously with the image information on LCD 6.

The user can select the color of the line drawings to be displayed on LCD 6 from a plurality of colors such as black, white, red, and green, by operating a color selection switch, not illustrated.

When execute (run) key 7B of operating keys 7 is pressed after input of line-drawing information by pen-type pointing device 46 and touch tablet 6A, the line-drawing information temporarily accumulated in the data area of buffer memory 35 is supplied to memory card 24 via CPU control bus 49 along with header information of input date and time, and they are recorded in the line-drawing information recording area of memory card 24.

The line-drawing information thus recorded in memory card 24 is information having undergone compression processing. Because line-drawing information input by touch tablet 6A contains much information having a high spatial frequency component, when compression processing is performed by the JPEG method used to compress the above-mentioned image information, the compression rate is poor, and the quantity of information is not significantly reduced. Furthermore, because compression by the JPEG method is irreversible compression, it is not suitable for compression of line-drawing information having little quantity of information. This is because gathering and spreading accompanying deficiencies in the information become prominent when decompressed and displayed on LCD 6.

Therefore, line-drawing information is compressed, for example, by the run-length method used in facsimile machines, and the like. The run-length method is a method that compresses line-drawing information by scanning the line drawing in a horizontal direction, and encoding continuous lengths of information (points) of each color, black, white, red, green, and the like, and the continuous lengths of non-information (parts not having pen input).

By using this run-length method, line-drawing information can be compressed efficiently. Also, even when the compressed line-drawing information is decompressed, it becomes possible to suppress deficiencies in the information. Line-drawing information also can be made so that it is not compressed when the quantity of that information is comparatively little.

Also, when an image is displayed on LCD 6, and when pen input is performed, as described above, the image data and line-drawing information input by pen are composed in frame memory 47, and a composite image of the image and line drawing is displayed on LCD 6. However, in memory card 24, the image data and the line-drawing information are recorded separately in the image recording area and the line-drawing information recording area. Thus, because the two types of information are recorded in different areas, the user can delete either image from the composite image of the image and the line drawing. Also, each type of image information can be compressed by individual compression methods and recorded.

Figure 5:
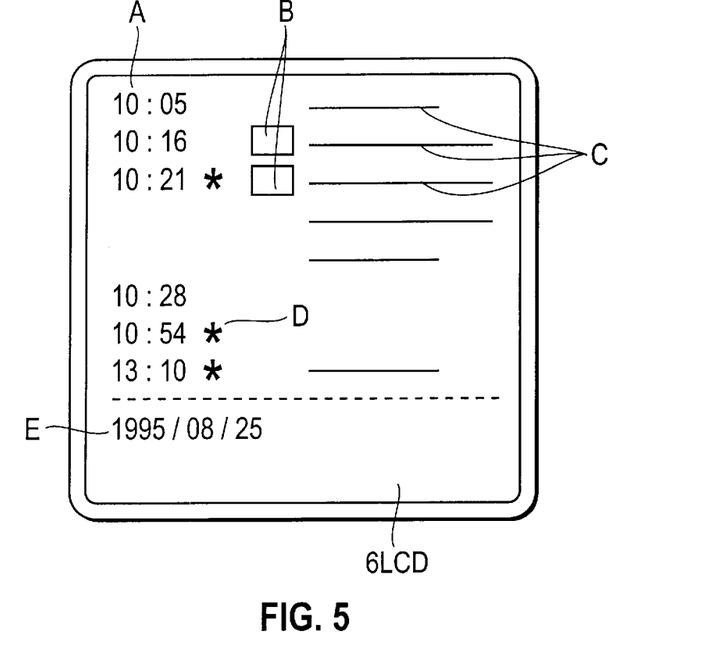
FIG. 5 is a drawing showing an example of a display screen displayed on an LCD of an electronic camera according to the present invention.

Also, when data is recorded in any one of the sound recording area, image recording area, and line-drawing information recording area of memory card 24, a list display screen showing a list A of the recorded information can be displayed on LCD 6 as shown in FIG. 5. In the list display screen on LCD 6 shown in FIG. 5, the year, month, and day (recording date E) (here, Aug. 25, 1995) of the moment when the information was recorded is displayed at the lower part of the screen, and the recording time of the information recorded on that recording date is displayed at the leftmost side of the screen.

On the right side of the recording time, there are displayed thumbnail images B when image data is recorded. The thumbnail images B are reduced images created by thinning out the bit-map data of each image recorded on memory card 24. Consequently, the information having thumbnail images displayed is information including image information. Namely, in the information recorded (input) at "10:16" and "10:21," image information is included, and in the information recorded at "10:05," "10:28," "10:54," and "13:10," no image information is included. Also, memo symbol "*" (specified as D) represents that a specified memo is recorded as line-drawing information.

Furthermore, on the right side of the display area of the thumbnail images B, there are displayed bars (lines) C of lengths corresponding to the lengths of the sound recording time. These sound information bars are not displayed when sound information is not input.

The user selects and specifies information to be reproduced by pressing inside a rectangular area where the desired information is displayed on the screen shown in FIG. 5 with the pen tip of pen-type pointing device 46, and reproduces the selected information by pressing execute (run) key 7B shown in FIG. 2 with the pen tip of pen-type pointing device 46. By this, the selected information is output.

For example, when the inside of band-shaped area where "10:05" is displayed, on the screen shown in FIG. 5, is pressed by pen-type pointing device 46, CPU 36 instructs DSP 33 to reproduce the sound corresponding to the selected sound recording date and time (10:05).

According to the instruction from CPU 36, DSP 33 reads the sound data from memory card 24, applies decompression processing, and then supplies the data to A/D-D/A converter 38. A/D-D/A converts to analog signals the sound data decompressed and supplied by DSP 33 and outputs the signals by speaker 5. When an earphone, not illustrated, is connected to earphone jack 9, the sound is output from the earphone rather than being output from speaker 5.

When reproducing image data recorded on memory card 24, the user selects that information by pressing the desired thumbnail image with the pen tip of pen-type pointing device 46, and reproduces that selected information next by pressing execute (run) key 7B.

The image data corresponding to the selected thumbnail is read from memory card 24 by DSP 33 and is decompressed. The decompressed image data is supplied to frame memory 47 via CPU control bus 49, and is stored as bit-map data. Next, control signals corresponding to the image data stored in frame memory 47 are supplied to LCD 6, and the corresponding image is displayed.

At this time, when sound data is also recorded (for example, in the cases of "10:16" and "10:21"), the sound can be output by speaker 5 or the earphone as described above.

Figure 6:
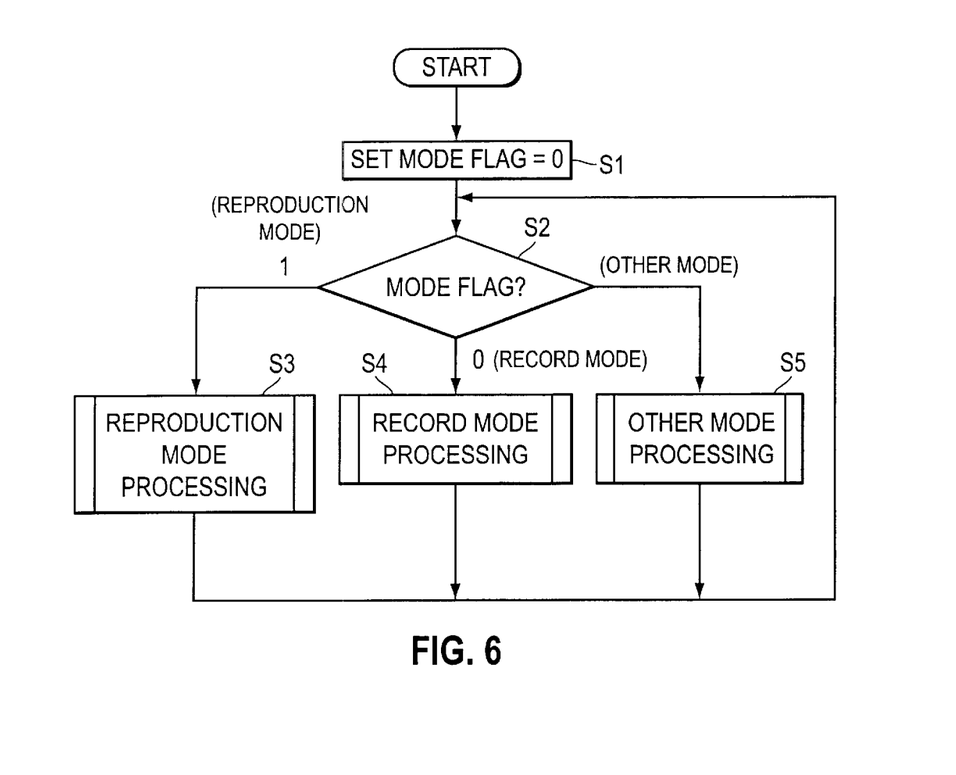
FIG. 6 is a flow chart explaining an operation of an electronic camera according to the present invention.
Figure 7:
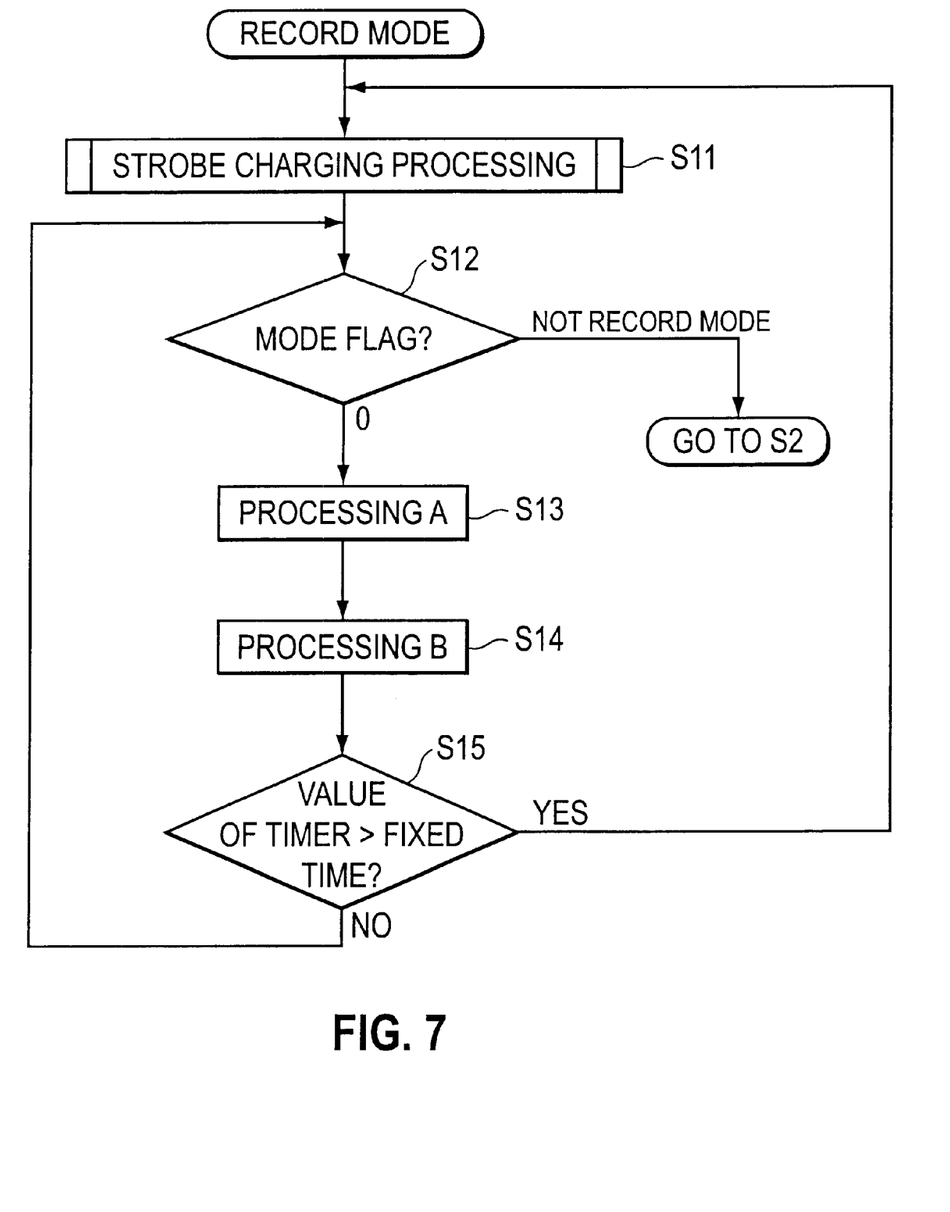
FIG. 7 is a flow chart explaining a processing procedure in a record mode of an electronic camera according to the present invention.
Figure 8:
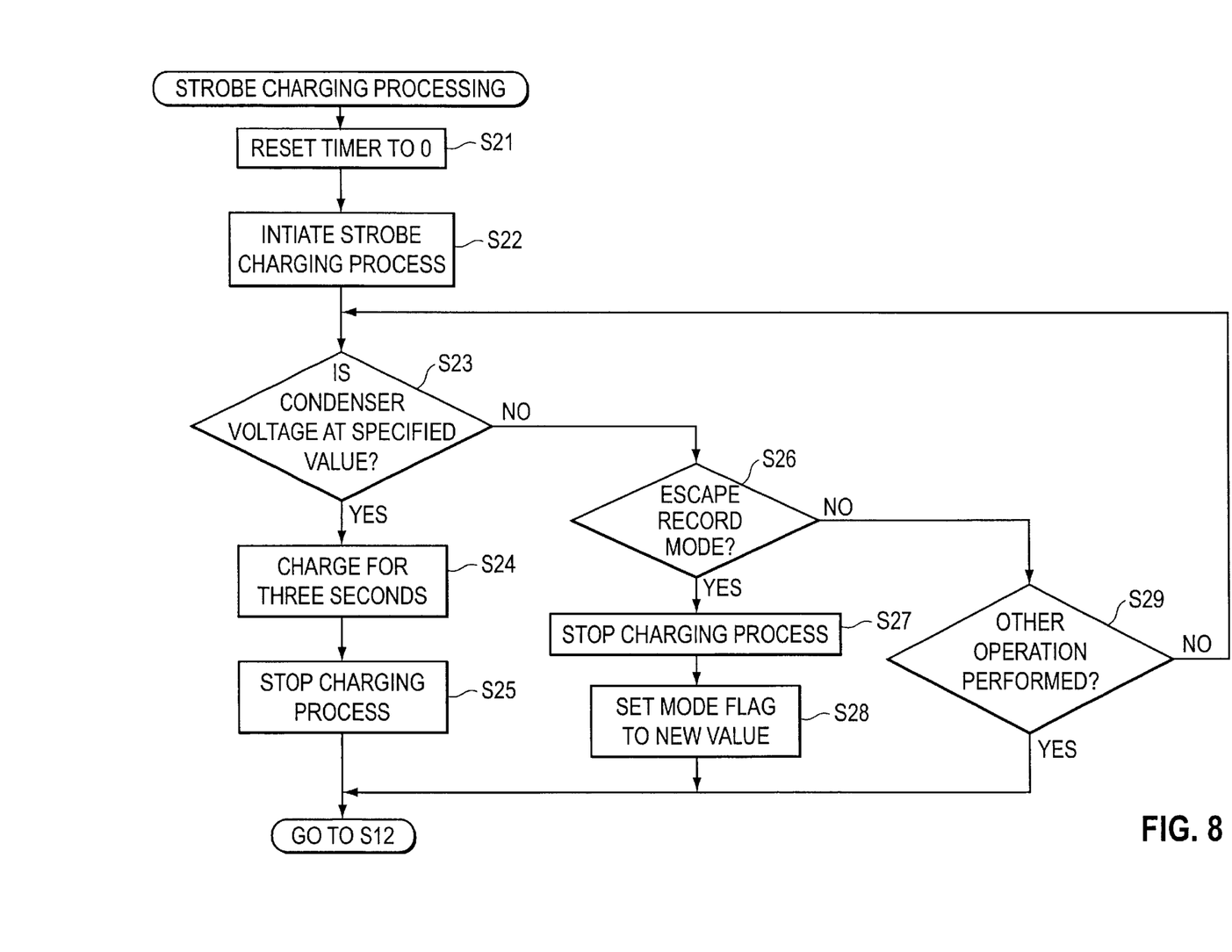
FIG. 8 is a flow chart explaining a processing procedure for strobe charging an electronic camera according to the present invention.

Next, the operation mainly in the record mode of electronic camera 1 is explained, referring to the flow charts shown in FIG. 6 through FIG. 8. First, in step S1 of FIG. 6, CPU 36 sets to 0 the value of a mode flag indicating record mode, reproduction (play) mode, and the like. Next, in step S2, the value of the mode flag is determined by CPU 36. When the value of the mode flag is determined to be 0, the operation advances to step S4, and processing in the record mode is executed. In the present case, because the value of the mode flag is set to 0 in step S1, the operation advances to step S4, and processing in the record mode is executed.

FIG. 7 is a flow chart showing the processing procedure in the record mode executed in step S4 of FIG. 6. First, in step S11, charging processing of strobe 4 is executed. That is, the process of supplying to condenser 22 the charge necessary for strobe 4 to operate is executed.

FIG. 8 is a flow chart showing the details of the processing executed in step S11 of FIG. 7. First, in step S21, the value of the count of timer 45 is reset to 0. Next, in step S22, processing initiation of the charging of strobe 4 is performed. For example, batteries 21 and condenser 22 are connected, and electric power is supplied from batteries 21 to condenser 22. As described above, condenser 22 constitutes strobe drive circuit 41, and charge voltage detection circuit 53 detects the charge voltage of condenser 22.

In step S23, the charge voltage of condenser 22 constituting strobe drive circuit 41 is detected by charge voltage detection circuit 53, and it is determined whether the charge voltage of condenser 22 is a specified value necessary for causing strobe 4 to flash. When the charge voltage of condenser 22 is determined to be the specified value, the operation advances to step S24, and additional charging for the amount of three seconds, for example, is performed. This is because there is variation in the precision of detection of charge voltage detection circuit 53, and it is performed in order to compensate for that.

Next, in step S25, end-of-charging processing is performed by control of CPU 36. For example, under control of CPU 36, strobe drive circuit 41 cuts the connection between batteries 21 and condenser 22, and stops the supply of electric power from batteries 21 to condenser 22, and the operation returns.

On the other hand, in step S23, when the charge voltage was determined to be less than the specified value, the operation advances to step S26, and it is determined whether an operation to escape the record mode was performed. For example, it is determined whether a switch for setting record mode and reproduction (play) mode was operated. When it was determined that an operation to escape record mode was performed, the operation advances to step S27, and end-of-charging processing is executed. Next, in step S28, the value corresponding to the other mode (for example, in this case, reproduction (play) mode, or the like, other than record mode) is set to the mode flag, and the operation returns to perform step S12 (FIG. 7).

Also, in step S26, when it is determined an operation to escape the record mode was not performed, the operation advances to step S29, and it is determined whether another operation was performed. For example, it is determined whether sound recording switch 12, touch tablet 6A, operating keys 7, and the like, were operated. When it is determined that another operation was not performed, the operation returns to step S23, and the processing from step S23 on down is executed iteratively. On the other hand, when it was determined that another operation was performed, the operation returns to perform step S12 (FIG. 7).

The processing of step S25, step S28 or step S29 ends, and the operation returns to perform step S12 (FIG. 7). Next, the operation advances to step S12 of FIG. 7, and the value of the mode flag is determined. When the value of the mode flag is determined to be 0 (record mode), the operation advances to step S13, and, according to the operation determined in step S29 of FIG. 8, an operation for causing a specified processing A to be executed is performed. In step S14, processing B is executed according to the operation specified in step S29 of FIG. 8.

Next, in step S15, it is determined whether the value of the count of timer 45 is greater than the value of the count corresponding to a specified time. When the value of the count of timer 45 is determined to be greater than the value of the count corresponding to the standard time, the operation returns to step S11, and charging processing of strobe 4 is executed again. The standard time here can be made, for example, two minutes. By this, condenser 22 can be charged in substantially two minutes, the charge accumulated in condenser 22 is discharged naturally, and the charge voltage can be prevented from dropping below the standard voltage necessary for causing strobe 4 to flash.

On the other hand, when it was determined that the value of the count of timer 45 is less than or equal to the value of the count corresponding to the specified standard time, the operation returns to step S12, and processing of steps S12 on down is executed iteratively.

Also, in step S12, when it was determined that the value of the mode flag is other than 0, that is, in step S26 of FIG. 8, it is determined whether an operation to escape record mode was performed, and in step S28, when a value (other than 0) corresponding to another mode (here, a mode other than record mode) was set to the mode flag, the operation returns, and it returns to step S2 of FIG. 6.

When, for example, the value of the mode flag was set to 1 (reproduction (play) mode) in step S28 of FIG. 8, it is determined in step S2 of FIG. 6 that the value of the mode flag is 1, the operation advances to step S3, and processing in the reproduction (play) mode is executed. Also, when the value of the mode flag was set to a value other than 0 and 1 in step S28 of FIG. 8, the value of the mode flag is determined in step S2 of FIG. 6 to be a value other than 0 and 1, the operation advances to step S5, and processing of the other mode is executed.

When the processing in step S3, the processing in step S4 or the processing in step S5 ends, the operation returns to step S2, and processing of steps S2 on down is executed iteratively.

Also, in step S3 and in step S5, in the same manner as in the processing of the record mode in step S4, when an operation to change the mode is performed, the operation returns, it returns to step S2, and processing of steps S2 on down is executed iteratively.

Thus, when power supply switch 11 is turned on, because the operation immediately enters the record mode, the user can photograph the image of a specified object by operating release switch 10 after having turned on power supply switch 11. Therefore, it is made such that a shooting opportunity is not missed. In the same manner, the user can record a specified sound by operating sound recording switch 12 after having turned on power supply switch 11. Therefore, it is made such that a sound recording opportunity is not missed.

Also, in record mode, because charging of the strobe 4 is performed within a specified time, charging of strobe 4 is not performed when photographing a specified object. Therefore, missing of a shooting opportunity due to strobe 4 not being caused to flash is controlled. Also, in a mode other than record mode, because charging of the strobe 4 is stopped, wasteful consumption of batteries 21 can be controlled.

Furthermore, in a mode other than record mode, it can be made such that supply of electric power to finder display circuit 51 and finder display element 52, provided inside optical finder 2, is stopped. Also, in a mode other than record mode, supply of electric power to the photographic components for performing processing related to photography, such as CCD 20, image processor 31, lens drive circuit 30, and CCD drive circuit 39, is stopped. Thus, wasteful consumption of batteries 21 can be controlled.

Also, in a mode other than recording mode, other than those mentioned in the above-mentioned embodiment, performance of the functions related only to recording may be stopped. For example, lens driving of the shooting lens can be stopped, which may be advantageous in a camera using an electronic zoom lens as a shooting lens and in a camera having an autofocus function.

In the illustrated embodiment, the camera controller can be implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 6–8 can be used as the controller. As shown, a distributed processing architecture is preferred for maximum data/signal processing capability and speed.

Incidentally, in the record mode as described above, sound recording switch 12 has a function for indicating the start of recording of sound input by microphone 8 to memory card 24. As a matter of fact, in the reproduction (play) mode, it is made such that sound recording switch 12 functions as a switch (reproduction (play) switch) for indicating the start of reproduction of sound data recorded on memory card 24. By this, one switch can be made to have a plurality of functions, simplification of the operating components can be accomplished, and operability can be improved.

In the above-mentioned embodiment, finder 2 was made an optical component, but it can also be made so as to use a liquid crystal finder using liquid crystal. Also, in the above-mentioned embodiment, only one microphone is provided, but two microphones may be provided on the left and right so as to record sound in stereo. Also, in the above-mentioned embodiment, each type of information was input using a pen-type pointing device, but it can also be made so as to input using a finger. Furthermore, the display screen displayed on LCD 6 is only one example, the invention is not limited to this, and it can be made to use screens of various layouts. Similarly, the types and layout of operating keys are only one example, and the invention is not limited to these.

What is claimed is:

1. An information processing apparatus, comprising:
    an input device for inputting information;
    a memory for storing information input by the input device;
    a power supply that supplies electric power to the input device;
    an indicator that indicates power supply to the input device;
    a mode switch that switches between a first mode to store in the memory information input by the input device, and a second mode to reproducing information stored in the memory;
    a strobe drive circuit having a condenser and a charge voltage detector that detects a charge voltage of the condenser; and
    a controller that controls the input device, the power supply, the mode switch and the strobe drive circuit, wherein when power supply is indicated by the indicator, the controller switches the mode switch to the first mode regardless of the mode selected by the mode switch, and activates the strobe drive circuit to start a charge operation of said condenser until either said charge voltage detector detects that the charge voltage of the condenser is charged over a predetermined level or the mode is switched from the first mode to the second mode.

2. An information processing apparatus as defined in claim 1, wherein the input device inputs an image, the first mode is an image recording mode and the second mode is an image reproducing mode.

3. A method for operating an information processing apparatus having a mode switch that switches between a first mode that stores information, and a second mode that reproduces information, comprising:
    inputting information using an input device;
    storing the input information in a memory;
    supplying electric power to the input device;
    indicating power supply to the input device;
    automatically switching the mode switch to the first mode regardless of the mode selected by the mode switch when the power supply is indicated by an indicator and then activating a strobe drive circuit having a condensor and a charge voltage detector that detects a charge voltage of the condensor to start a charge operation of said condensor until either said charge voltage detector detects that the charge voltage of the condensor is charged over a predetermined level or the mode is switched from the first mode to the second mode.

4. An information processing apparatus, comprising:
    an input device for inputting information;
    a memory for storing information input by the input device;
    a power supply that supplies electric power to the input device;
    an indicator that indicates power supply to the input device;
    a mode switch that switches between a first mode to store in the memory information input by the input device, and another mode which does not operate the input device;
    a strobe drive circuit having a condenser and a charge voltage detector that detects a charge voltage of the condenser; and
    a controller that controls the input device, the power supply, the mode switch and the strobe drive circuit, wherein when power supply is indicated by the indicator, the controller operates the mode switch and the strobe drive circuit to:
        (a) switch the mode switch to the first mode regardless of the mode selected by the mode switch,
        (b) activate the strobe drive circuit to start a charge operation of the condenser until said charge voltage detector detects that the charge voltage of the condenser is charged over a predetermined level,
        (c) stop the charge operation of the condenser when the mode is changed to the another mode from the first mode, and
        (d) resume the charge operation of the condenser when the mode is returned to the first mode from the another mode.

5. An information processing apparatus as defined in claim 4, wherein the input device inputs an image and the first mode is an image recording mode.

6. An information processing apparatus as defined in claim 4, wherein the input device inputs an image and the another mode is an image reproducing mode.

7. An information processing apparatus as defined in claim 4, wherein the input device inputs an image and the another mode is a sound recording mode.

8. A method for operating an information processing apparatus having a mode switch that switches between a first mode to store in a memory information input by an input device, and another mode which does not operate the input device, the method comprising:
    inputting information using the input device;
    storing the input information in the memory;
    supplying electric power to the input device;
    indicating power supply to the input device using an indicator;
    detecting a charge voltage of a condenser in a strobe drive circuit; and
    controlling the input device, the power supply, the mode switch, and the strobe drive circuit wherein when power supply is indicated by the indicator, the controller operates the mode switch and the strobe drive circuit to:
        (a) switch the mode switch to the first mode regardless of the mode selected by the mode switch,
        (b) activate the strobe drive circuit to start a charge operation of the condenser until a charge voltage detector detects that the charge voltage of the condenser is charged over a predetermined level,
(c) stop the charge operation of the condenser when the mode is changed to the another mode from the first mode, and
(d) resume the charge operation of the condenser when the mode is returned to the first mode from the another mode.

* * * * *